March 9, 1948.                P. B. LEVITT ET AL                2,437,262
              ELECTRIC HEATER THERMOSTATIC SWITCH CONTROL
                    Filed Jan. 17, 1946              2 Sheets-Sheet 1

INVENTOR.
Percy B. Levitt
BY John D. Morgan
William G. Pulliam
ATTORNEY.

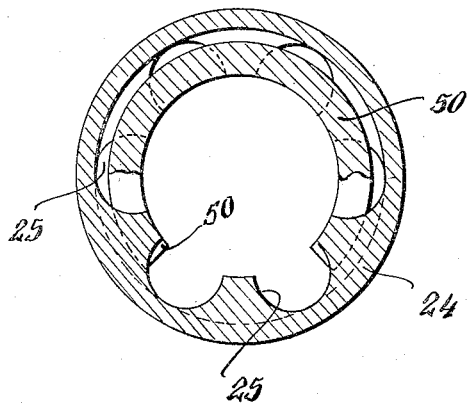
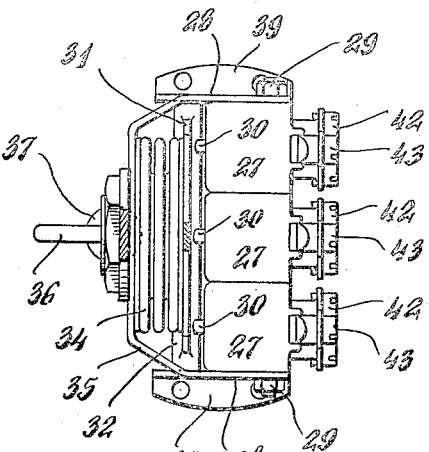
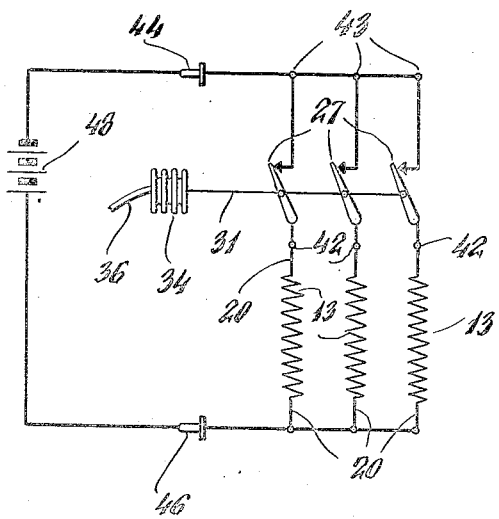
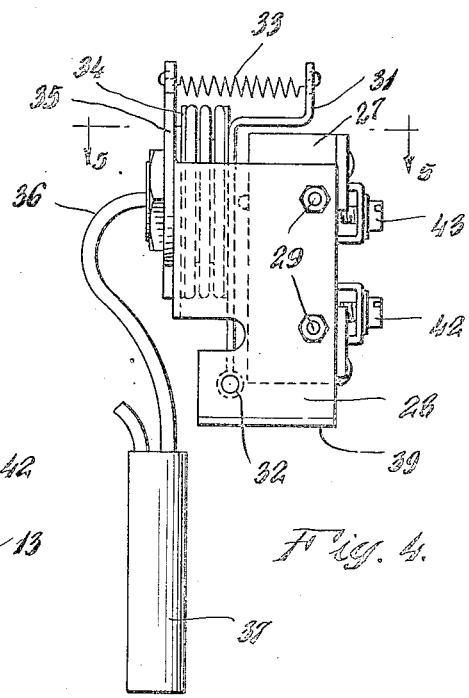

Patented Mar. 9, 1948

2,437,262

UNITED STATES PATENT OFFICE 2,437,262

ELECTRIC HEATER THERMOSTATIC SWITCH CONTROL

Percy B. Levitt, Millburn, and John D. Morgan, South Orange, N. J., assignors to Cities Service Oil Company, New York, N. Y., a corporation of Pennsylvania Application January 17, 1946, Serial No. 641,675

7 Claims. (Cl. 219—38)

This invention relates to electric heating apparatus and more particularly to improvements in unitary immersion devices for heating water and other liquids.

The principal object of the invention is to provide a compact and light weight unit which is particularly adapted to serve as a source of supply of the relatively small quantities of domestic hot water which are required in commercial airliners and in other places where weight, space and factors of safety are of prime importance.

It is a more specific object of the invention to provide immersion heating apparatus having a plurality of parallel heating circuits which are arranged to be energized in some sequential relation so as to place a minimum load upon the electrical supply system in offsetting radiation and conduction losses from a tank of hot water, for example, while assuring full and adequate capacity for heating an incoming stream of cold water at an appropriately rapid rate during periods when hot water is being withdrawn from such a tank.

A further object of the invention is to provide an immersion heater having two or more parallel heating circuits and thermostatic control for regulating their energization, all arranged in a compact unit which may readily be installed in the wall of a suitable hot water tank or the like, and in which the control components comprise a unitary sub-assembly so installed as to be readily withdrawable for replacement or repair without disturbing the remainder of the heater installation.

The foregoing and other objects, as well as various features, will be better understood from the following description of a preferred embodiment of the invention as illustrated in the accompanying drawings, in which Fig. 1 is a side elevational view of a water heating tank having an immersion heating unit installed in one of its walls;

Fig. 3 is a sectional view taken on the line 3—3 of Fig. 2 with certain parts omitted;

Fig. 4 is a side elevational view of the unitary control assembly for the heating unit of Figs. 1 and 2;

Fig. 5 is a top plan view of the unit of Fig. 4 with certain elements being broken away along the line 5—5 of Fig. 4 better to show underlying ones; and Fig. 6 is an electrical diagram showing the interconnection of the heating elements of the unit of Figs. 1 and 2 with a suitable source.

Figure 1:
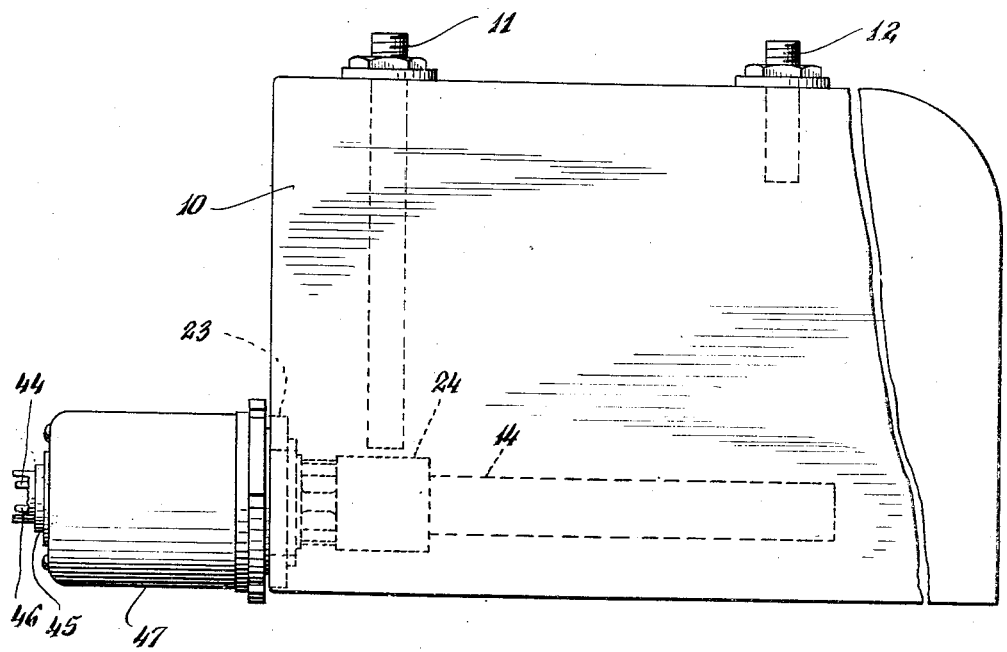

In the drawings and referring to Fig. 1, numeral 10 identifies a small aluminum tank to which cold water may be supplied through inlet 11 and from which hot water may be withdrawn through outlet 12. This particular unit has been designed for installation in a commercial airliner where it will serve to satisfy the small and variable demands for hot water in the lavatories and kitchen. Since its construction and manner of installation forms no part of the present invention, these matters require no further discussion.

The heating of water in tank 10 is accomplished by an immersion heater unit comprising three resistance elements 13 arranged in parallel circuit relation (Fig. 6) and confined within a tubular metal casing 14, which latter element has a contracted neck 15 disposed in off-center position and terminating in a threaded stud 16 which is secured to the bottom wall 17 of a mounting cap 18 by means of an appropriate castle nut 19. In the final assembly this neck portion of the casing also serves as a conduit through which leads 20 may be extended from the resistance elements to a suitable control assembly and a source of power supply in a manner later to be considered.

It will be observed that cap 18 is provided with an externally threaded bushing 22 which is adapted to be screwed into the internally threaded flange 23 formed in one of the side walls of tank 10 so that the encased heating elements may lie in a horizontally disposed position near the bottom of that tank. In the preferred embodiment, a shield 24, threaded into bushing 22 serves both to brace the assembly, relieving the bottom wall of cap 18 of a portion of the strain of carrying the rather heavy heating elements and their casing in a horizontal position, and to direct a flow of water through the lobe-like openings 25 in its outer end over the inner end of heater casing 14, and through side openings 26 around neck 15 to prevent overheating of the parts and excessive loss of heat by transmission to the cap element.

The control elements for the heating unit are preferably arranged as a unitary sub-assembly for mounting upon the outer end of cap 18 where it will be readily accessible for repair or replacement without disturbing the installation of the heater elements in tank 10. As shown in Figs. 4 and 5, this sub-assembly includes three independent switches 27, of the micro type, one for each of the heating elements 13, disposed in side by side relation and substantially filling the space between the legs 28 of the U-shaped metal frame, to which they are affixed by bolts 29 with their actuating buttons 30 facing a bridge element 31. The latter has its lower end pivotally mounted in the legs 28 of the frame as indicated at 32, while its upper end is held by spring 33 against the free end of a bellows 34 mounted in the U-portion 35 of the frame. It will be recognized that this bellows constitutes the movable diaphragm of a closed system including connecting tube 36 and a conventional thermoresponsive bulb 37, and that it is caused to distend and collapse by the expansion and contraction of a selected fluid in the system in response to the rise or fall of the temperature affecting the bulb. Those familiar with the art will appreciate that any other suitable form of diaphragm may be substituted for the bellows.

Figure 2:
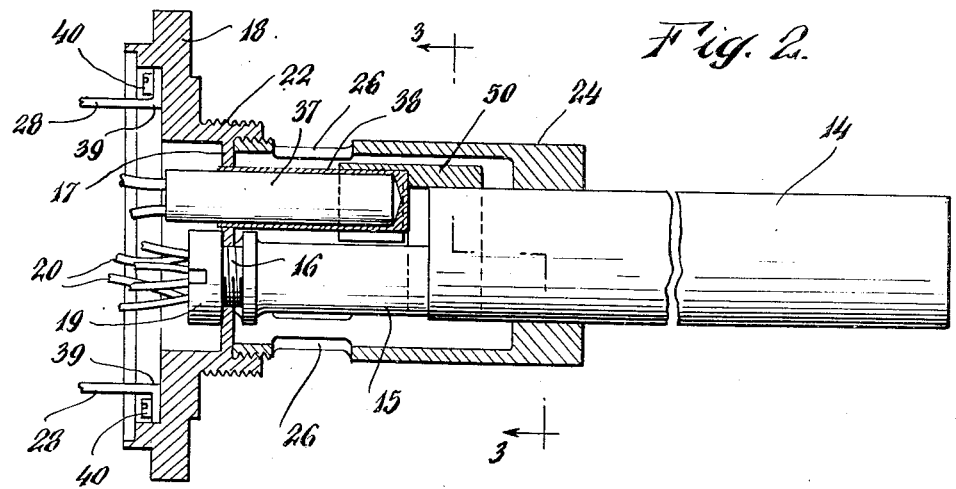
Fig. 2 is a view partly in section and partly in elevation of a portion of the heating unit of Fig. 1.

The installation of the unitary control sub-assembly is illustrated in Figs. 1 and 2, the bulb 37 being snugly fitted in metal to metal contact within a well 38 in the cap, and the flanged portions 39 of the frame being secured by bolts 40 to the main body of the cap to hold the entire sub-assembly in place. In its installed position the lower contacts 42 are readily accessible for connection to three of leads 20 from the heater elements 13, while their upper contacts 43 are likewise accessible for connection to a common lead to one of the prongs 44 of a conventional connector 45, leaving the remaining three leads 20 free for connection to the second prong 46 of the connector (Figs. 1 and 6). A cover 47 may then be applied to shield and protect the entire control assembly, leaving the connector open for plugging into a source of power as represented by battery 48 in Fig. 6.

In considering the operation of the heater unit it will be assumed that all three of the heating elements 13 are energized through the normally closed switches 27 so that their full capacity is devoted to heating water in tank 10. The elements of the illustrated unit have a rated capacity of about 1500 watts, and the heating of the approximately two gallons of water, the capacity of tank 10, will be correspondingly rapid. In the course of that heating a thermo-siphon circulation of water will be established through the lobe-like openings 25 and side openings 26 of shield 24, and its rising temperature will be reflected by a rise in temperature of the fluid-filled system of the control, causing a distension of bellows 34 and a corresponding depression of actuating buttons 30 by bridge 31. As the temperature of the water approaches some desired value, say 140° F., first one, then another of the switches 27 is opened to reduce the heating effect, all of them being opened, of course, when the desired temperature has been achieved. Conversely, as the temperature of the water in tank 10 begins to fall below the cut-off value, the pressure in the fluid-filled system falls and bellows 34 begins to collapse, allowing bridge 31 to be retracted by spring 33 so that first one, and then another, and finally the last of switches 27 may close to energize the several heater elements and offset the falling temperature.

The sequential energization of the three parallel heating circuits is attributable almost entirely to inherent differences between the several switches 27. These micro devices are designed to be operated from closed to open position, and vice-versa, by an exceedingly small movement of their actuating buttons. The illustrated ones (Type-Z—Micro Switch Corporation, Freeport, Illinois) have a total travel of about .020 inch while actuation of their circuit-making contacts occurs during about .0025 of an inch of that movement. It is altogether evident that manufacturing tolerances cannot be held within such close limits that all switches of this type will be opened and closed during exactly the same portion of button travel. On the contrary, almost any three switches of this kind which may be selected at random from a suitable stock will differ from one another in the location of their cut-off points in the total button travel by as much as .002 of an inch. Again, manufacturing tolerances exist in the installation of the switches in their supporting frames, and the ends of their actuating buttons may be out of line as much as .005 to .001 of an inch. The overall result of these and other variations within normal manufacturing tolerances is such that bridge 31, even though it presses upon the buttons simultaneously, opens first one switch, then another, and finally the third, and allows those switches to close in reverse sequential order when the bridge is retracted by spring 33. If by some chance all of the switches of any particular control unit open and close simultaneously, something which has never been noted in actual manufacture of these devices, it is only necessary to substitute other switches taken from normal stock or to give a slight twist to bridge 31.

The order in which the switches open and close, and the degree of movement of bridge 31 which must follow one opening or closing before the next switch is actuated, are factors having little importance to the satisfactory operation of the illustrated heater unit. The important thing is that as the temperature of the water in tank 10 approaches its desired final value, the heating circuits will be cut off in some sequence, so as to reduce the heat input to the tank, and allow as little over-ride of that cut-off value as is possible. Contrariwise, when the tank temperature drops slowly by the transmission of heat through the water connections and by radiation, one of the switches 27 will close before the others, and the energization of its associated heating element 13 will generally suffice to bring the temperature of the water back to the desired cut-off value before the other two switches have a chance to be actuated. This means, of course, that a minimum load is placed upon the power circuit in maintaining the tank temperature at a desired point during periods when water is not being withdrawn from it, and at the same time assures full heating capacity when hot water is being withdrawn and cold water introduced into the tank.

It has been noted above that switches 27 are of the normally closed variety and are opened by rise in temperature affecting the thermo-sensitive bulb 37, a rise which is, of course, intended to reflect the heating of water in tank 10. If by chance the heating circuit is plugged into a source of current at a time when there is no water in the tank, it is obvious that there would normally be a very considerable lag in the transmission of heat from casing 14 to well 38, and a consequent slowness of reaction upon bulb 37. In order to prevent destructive overheating of elements 13 and casing 14 under such circumstances, a thermal connector 50 is installed between the inner end of casing 14 and the outer adjacent end of thermometer well 38. This connector, as may best be seen in Figs. 2 and 3, is a separate piece of metal which fits snugly over the end of the well 38 and partially surrounds the inner end of casing 14, providing a metal to metal path from one part to the other. The extent of this metal to metal heat transfer path is intentionally made very small so that it will have little or no effect upon the control assembly during normal operation of the water heating unit. In such circumstance the thermal connector does little more than furnish additional heat transfer surface, and bulb 37 is caused to respond primarily to changes in temperature of water flowing over the outer surface of well 38. In those rare cases, however, in which tank 10 runs dry, then the bridge element provides a direct path for the transmission of heat from the heater casing to the control bulb so that bulb 37 may respond immediately to open switches 27 and shut off the flow of power.

The invention has been described primarily in its adaptation to a water heating unit in which three parallel heating circuits have been employed in order to gain a desired total wattage, while keeping the electrical load on each circuit within the rated capacity of its associated micro switch. It will be evident, however, that its principles are not limited to water heating, and that the number of heating circuits may be reduced or increased as specific conditions may require. It will also be apparent that the control arrangement is applicable to the sequential operation of any multi-circuit heating device, whether in the unitary form shown or in some other form. Thus, having described our invention in its broadest aspects and illustrated it by way of specific example, what we claim as new and useful is:

1. Electric heating apparatus comprising a plurality of resistance heating elements arranged in parallel circuit relation, a switch in circuit with each of said elements, each such switch having an actuating button which is adapted by travel of a few thousandths of an inch to open and close its associated circuit, a bridge element overlying all of said buttons and a thermostatic member responding to the delivery of heat by said elements, said member being operatively connected to said bridge to cause it to engage all of said buttons simultaneously and by continued movement in a given direction to actuate said switches in sequence.

2. Electric heating apparatus comprising a plurality of resistance heating elements arranged in parallel circuit relation, a switch in circuit with each of said elements, each such switch having an actuating button which is adapted by travel of a few thousandths of an inch to actuate its associated circuit, means for supporting said switch with their actuating buttons in generally aligned relation, a bridge element overlying all of said buttons, and thermostatic means adapted to respond to the delivery of heat by said elements, said means including a movable diaphragm element operatively connected to said bridge and being arranged to force said bridge to engage all of said buttons substantially simultaneously and to actuate said buttons in sequence.

3. Electric heating apparatus comprising a plurality of resistance heating elements arranged in parallel circuit relation, a switch in circuit with each such resistance element, each such switch having an actuating button which is adapted by travel of a few thousandths of an inch to open or close its associated circuit, means for supporting said switches with the ends of their actuating buttons in generally aligned relation, a bridge element having a substantially flat portion overlying the ends of said actuating buttons, and thermostatic means responding to the delivery of heat by said elements, said thermostatic means including a bellows having a free end engaging said bridge, said bellows being adapted upon distension to press said bridge substantially simultaneously against said buttons to actuate said switches in sequence, such sequential operation being the result of differences in the location of the operating range of said switches in their total button travel, and of differences in positions in which they are supported, all such differences being within the limits of manufacturing and assembly tolerances for such switches.

4. An electric immersion heater comprising a plurality of resistance elements connected in parallel circuit relation, a common casing for said elements, a plurality of switches each connected in circuit with one of said resistance elements and each having an actuating button which is adapted by travel of a few thousandths of an inch to actuate its contact elements, a movable bridge member engaging the ends of all of said actuating buttons, a movable diaphragm mounted in opposing relation to said bridge, and thermosensitive means for distending and collapsing said diaphragm responsive to the delivery of heat by said elements whereby to cause said bridge by continued movement in a given direction to actuate said switches in sequence.

5. An electric heater comprising a plurality of resistance elements arranged in parallel circuit relation; a unitary control assembly for said elements comprising a frame, a plurality of switches mounted in said frame, each such switch having a button which is adapted by travel of a few thousandths of an inch to actuate its contact elements, a bridge member pivotally mounted in said frame, said bridge overlying said switches and being adapted to engage all of such buttons substantially simultaneously, a bellows mounted in said frame with its free end engaging said bridge, and thermosensitive means for distending said bellows responsive to the delivery of heat by said elements to swing said bridge against said buttons to actuate said switches in sequence, such sequential operation being the result of differences in the location of the operating range of said switches in their total button travel, and of differences of position in which they are mounted, all such differences being within the limits of manufacting and mounting tolerances for such switches; and electrical connections between each of said resistance elements and one of said switches.

6. An electric immersion heater unit comprising a plurality of resistance elements arranged in parallel circuit relation, a casing for said elements, said casing having an open end through which leads from said elements may be extended, and a mounting cap secured to the open end of said casing; a unitary sub-assembly comprising a frame secured to said cap, a plurality of switches each having an actuating button which is adapted by travel of a few thousandths of an inch to actuate its associated contacts, said switches being mounted in said frame with their actuating buttons lying in aligned relation, a bridge member pivotally mounted in said frame and overlying said actuating buttons, and a fluid-filled thermosensitive system including a capsule connected to a bellows element, said capsule being disposed in said cap adjacent said casing so as to be affected by heat delivered by said elements, and said bellows being mounted in said frame in cooperative relation to said bridge member such that its distension causes said bridge to press upon said buttons substantially simultaneously and to actuate said switches in sequence; and electrical connections between each of said resistance elements and one of said switches.

7. An electric immersion heater comprising a unitary heating member including a plurality of resistance elements arranged in parallel circuit relation, and a casing for said elements having an open end through which electrical connections may be extended; a mounting cap secured to such open end of said casing, said cap having a well extending adjacent said end portion of said casing; a unitary sub-assembly comprising a frame secured to said cap, a plurality of switches each having an actuating button which is adapted by travel of a few thousandths of an inch to actuate its associated contacts, said switches being mounted in said frame with their actuating buttons lying with their ends in generally aligned relation, a bridge member pivotally mounted in said frame and adapted to be urged into engagement with the ends of said buttons, and a fluid filled thermosensitive system, including a capsule connected to a bellows member, said capsule being removably positioned in said well of said cap so as to be affected by heat delivered by said resistance elements, and said bellows being mounted in said frame with its free end engaging said bridge whereby its distension may cause said bridge to press upon said buttons simultaneously and actuate said switches in sequence; and electrical connections between each of said resistance elements and one of said switches.

PERCY B. LEVITT.
JOHN D. MORGAN.

REFERENCES CITED

The following references are of record in the file of this patent:

UNITED STATES PATENTS

| Number | Name | Date |
|---|---|---|
| 2,023,544 | Pierson | Dec. 10, 1935 |
| 1,643,575 | Clark | Sept. 27, 1927 |
| 2,019,058 | Rippe | Oct. 29, 1935 |
| 2,050,479 | Winther | Aug. 11, 1936 |
| 2,258,835 | Williams | Oct. 14, 1941 |
| 2,358,732 | Otto | Sept. 19, 1944 |
| 2,304,802 | Crew | Dec. 15, 1942 |

FOREIGN PATENTS

| Number | Country | Date |
|---|---|---|
| 423,739 | Great Britain | Feb. 7, 1935 |